United States Patent [19]

Hartley

[11] Patent Number: 5,117,557
[45] Date of Patent: Jun. 2, 1992

[54] CUTTING DEVICE

[76] Inventor: Wayne Hartley, 1429 Mosstree Rd., North Charleston, S.C. 29406

[21] Appl. No.: 513,217

[22] Filed: Apr. 23, 1990

[51] Int. Cl.⁵ .............................. B25F 1/00; B25F 1/04
[52] U.S. Cl. ......................................... 30/134; 30/135
[58] Field of Search .................. 30/131, 134, 135, 124

[56] References Cited

U.S. PATENT DOCUMENTS

| | | | |
|---|---|---|---|
| 594,072 | 11/1897 | Forde | 30/134 |
| 778,140 | 12/1904 | Paff | 30/134 |
| 1,636,088 | 7/1927 | Bernard | 30/135 |
| 2,064,105 | 12/1936 | Conlee | 30/134 |
| 3,333,337 | 8/1967 | Austin, Jr. et al. | 30/134 |
| 3,443,313 | 5/1969 | Profy | 30/134 |
| 4,185,379 | 1/1980 | Amstutz | 30/134 |
| 4,246,698 | 1/1981 | Lasner et al. | 30/134 |

Primary Examiner—Douglas D. Watts
Assistant Examiner—Paul M. Heyrana, Sr.
Attorney, Agent, or Firm—B. Craig Killough

[57] ABSTRACT

A cutting device which retains a severed portion of an object between two jaws. The cutting device is a mechanism such as shears, clippers or cutters having a jaw and a blade which close against each other so as to cut an object, and a second jaw which moves as said blade moves so as to retain a severed portion of the object which has been cut between said jaws, keeping the severed portion from falling away.

8 Claims, 2 Drawing Sheets

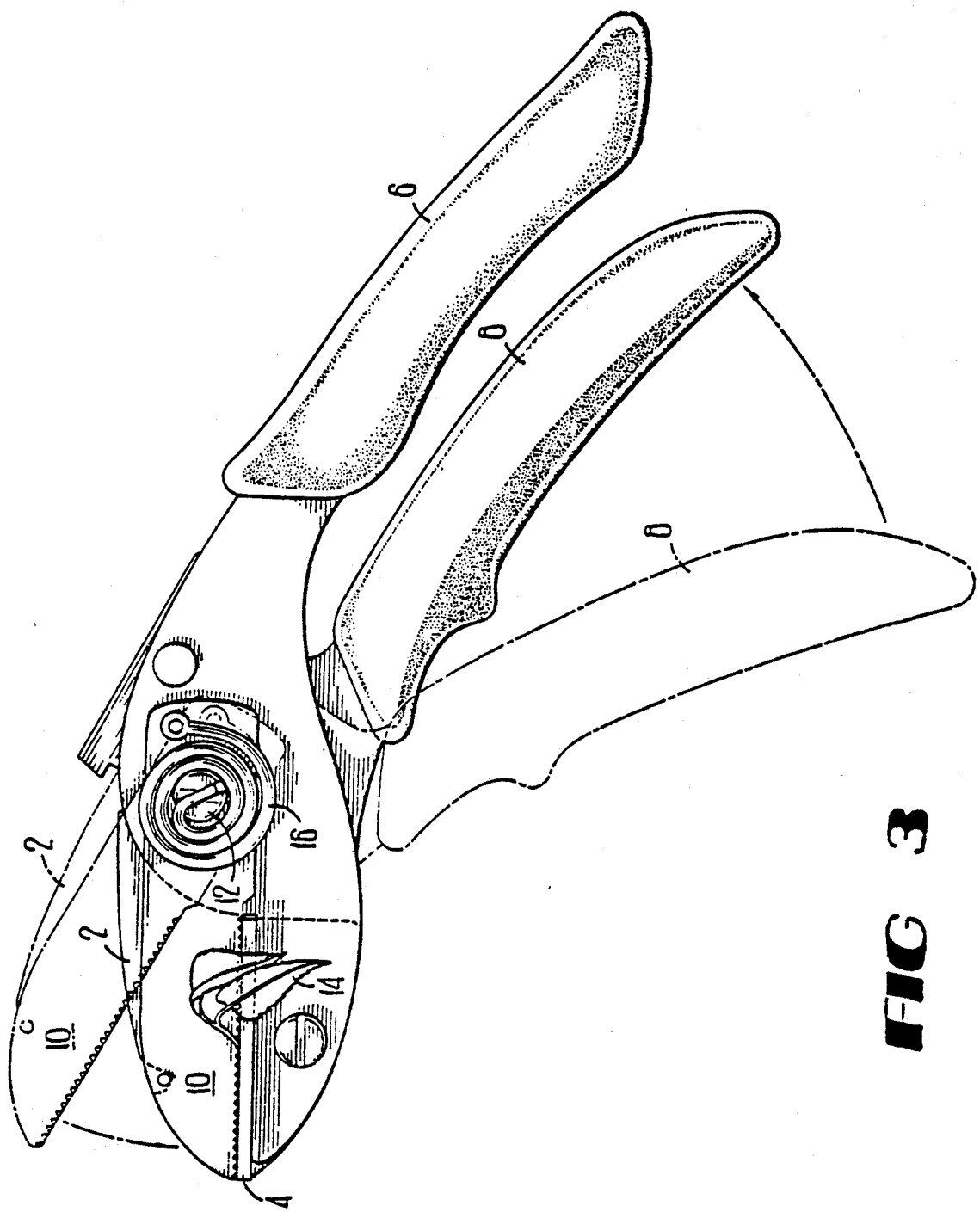
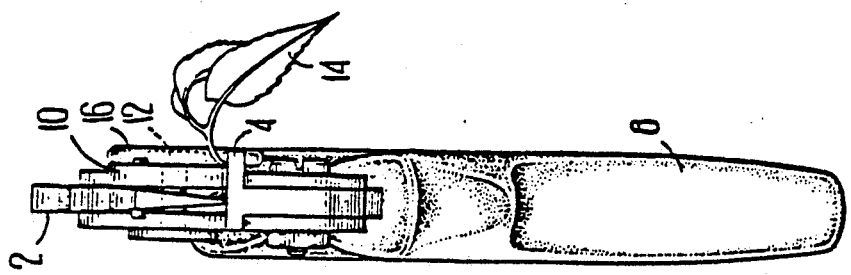

CUTTING DEVICE

BACKGROUND OF THE PRESENT INVENTION

The present invention relates to cutting devices generally, and is more particularly related to cutting devices having two jaws or blades which are actuated toward each other so as to perform a cutting function, and is more specifically related to such devices which have a retaining means which will hold a portion of an object which has been cut or severed so that the severed portion of the object may be retained within the device.

Cutting devices which have two jaws or blades actuated toward each other by means of handles are well known in the art. Such devices include scissors, bolt cutters, garden shears, nail clippers, and many other devices which are similar in operation, but which are particularly adapted to specified functions.

A few of such devices found in the prior art have a retaining means which holds the portion of the object which has been severed within the device so that the severed portion does not fall away, but is held by the device for the desired disposition of the severed portion.

These devices use a retaining means in some pivotal relationship with the jaws or blades which holds the severed portion against one of the jaws or blades. Mori et al., U.S. Pat. No. 4,099,326, discloses such a device wherein a retaining means holds a severed branch against a shear element. In Mori et al '326, the retaining means is manually actuated, such by an index finger, separately from the normal actuation and operation of the shear elements by means of the portions (handles). In Mori et al., U.S. Pat. No. 4,117,592, the retaining means is actuated by the movement of the shear elements as they are actuated by the handles. The retaining means is actuated so as to hold the severed portion of the object by the abutment of an edge of the shear element against the retaining means.

In Mori et al., '326, the retaining means is not operable without the separate, manual operation of it apart from the normal use of the shearing device by displacement of the handles toward each other. In Mori et al., '592, the retaining means is actuated by the normal movement of the handles to actuate the shear elements by the hard abutment of an edge of one shearing element against the retaining means. Such actuation tends to put too much pressure on the retaining element, and potentially at the wrong time, meaning that the object which is severed must be large enough or the severed portion will not be retained within the device. If the object is too large, the shearing elements of the device may not fully and properly close against each other so as to sever the object.

Ishida et al., U.S. Pat. No. 4,217,692, likewise uses a retaining member which is actuated as the handles of the device are actuated to cause the blades to close and cut. Again, however, this device uses contact between an edge of an opposite blade to abut against and actuate the retaining means.

SUMMARY OF THE PRESENT INVENTION

The present invention is a cutting device having two blades or jaws which may be displaced towards each other by displacing handles connected to said blades or jaws toward each other. As the blades or jaws close, the device severs a portion of the object. This device could be adapted to many such cutting devices, including scissors, wire cutters, gardening shears or the like.

The present invention comprises a retaining means, or jaw, which holds a portion of an object which is severed against an opposite blade or jaw. The retaining means is actuated simultaneously with the jaws or blades by displacing the handles toward each other.

The retaining means or jaw moves simultaneously with one of the blades or jaws, and is in the same pivotal relationship with this blade or jaw. The retaining means is in a spring biased relationship with this blade or jaw, so that as the blade or jaw severs a portion of the object, the retaining means is displaced relative to the blade or jaw with which it is in a spring biased relationship, so as to hold the portion of the severed object against the opposite blade or jaw by means of pressure exerting on the retaining means by spring biasing.

DETAILED DESCRIPTION OF THE DRAWINGS

FIG. 2 is a front elevation of the cutting device.

FIG. 3 is a side elevation of the device showing the action of the handles, jaws and blade as the handles are displaced toward each other.

DETAILED DESCRIPTION OF THE PREFERRED EMBODIMENT

Figure 1:
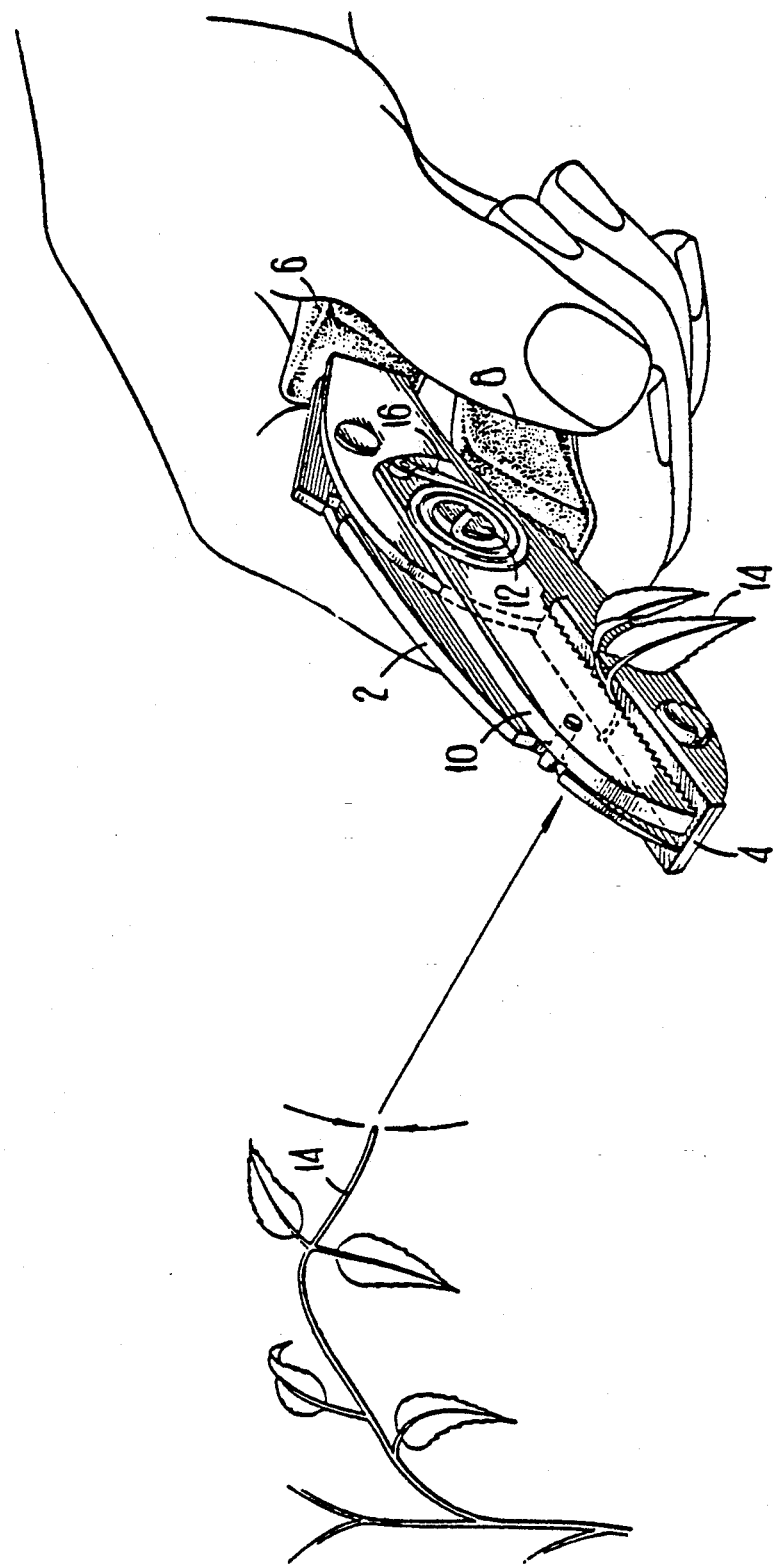
FIG. 1 is a perspective view of the device having been actuated so as to close the blade and jaws and to sever a portion of a plant by means of the blade closing against first jaw, with a portion of the plant severed held within the device by means of a second jaw being forced toward said first jaw by spring biasing means.

FIGS. 1 through 3 show the present invention in an embodiment as garden shears. As is shown in FIG. 1, the device may be used to cut the stem of a plant, with the cut portion is retained within the device for subsequent removal. The device is particularly useful in this embodiment in that the shears may be used to cut a flower, such as a rose, and rather than the flower falling away, the flower is retained within the jaws of the shears. It is therefore not necessary for the user to place a hand in the thorns of a rose bush for the purpose of retrieving a rose which has been cut. However, the device may be used in embodiments such as scissors, wire cutters, or other similar devices. By way of additional example, the device could be used to cut circuit devices, such as diodes, from a circuit, and the diode could be extracted without a separate act of retrieval.

As shown in the drawing, two cutting members which are in a pivotal relationship with each other. More particularly, the device is shown as having a cutting blade 2 and a jaw 4, or anvil. Blade 2 and anvil 4 are each connected to a handle 6,8, and are in a pivotal relationship with each other.

Blade 2 and jaw 4 are actuated toward each other by handles 6,8 which are actuated toward each other. When the handles are squeezed or displaced toward each other, the pivotal relationship causes blade 2 to move toward jaw 4, until blade 2 and jaw 4 contact each other. An object 14 which is placed between blade 2 and jaw 4 is severed at or slightly before blade 2 strikes the jaw 4.

A second jaw 10, which is a retaining jaw, is in a spring biased relationship with blade, and in a pivotal relationship with jaw. In the preferred embodiment, a single pivot point 12 is used, so that jaw 10 is displaced with blade 2 toward jaw 4 as the handles 6,8 are displaced toward each other. In the preferred embodiment, a coil spring 16 is used to spring bias jaw 10, although other spring biasing means may be used.

As handles 6,8 are displaced toward each other, blade 2 and jaw 10 move toward jaw 4, and strike an object 14 to be cut. Blade 2 continues through said object 14 to strike jaw 4, severing object 14. Jaw 10, which is in a pivotal relationship with jaw 4 also moves with blade 2. However, because of the spring biased relationship between blade 2 and jaw 10, when retaining jaw 10 strikes object 14, it is displaced by the object, and does not continue to travel to said jaw 4, but rests against a portion of the object which has been severed, and retains the object against jaw 4.

By means of spring biasing, retaining jaw 10 applies pressure to the portion of the object which has been severed. The use of spring biasing allows the object to be held, almost irrespective of the size of the severed object. If the blade is capable of cutting the object, retaining jaw will hold the severed portion since jaw 10 is displaced away from jaw 4 by the object. Spring biasing urges jaw 10 toward object so as to hold object against the jaw 4.

Jaw 4 may be a flat plane or anvil of sufficient width to allow the blade to strike jaw 4 and cut the object, while jaw 10 can hold the severed portion against the jaw 4. Jaw 10 may be serrated to aid in gripping. A locking means for the jaws could be provided.

What is claimed is:

1. A cutting device which will retain an object which has been severed, comprising:
   a. a first jaw;
   b. a blade attached to said first jaw which is in a pivotal relationship with said first jaw, wherein said blade closes against said first jaw so as to sever an object as said first jaw and said blade are pivoted toward each other; and
   c. a second jaw which is attached to said blade by means which allows said blade and said second jaw to pivot relative to each other about a common point, and wherein said blade and said second jaw are in a spring biased relationship by means of a coil spring located over said means which allows said blade and said second jaw to pivot relative to each other, so that as said first jaw and said blade are pivoted toward each other so as to close, a portion of said object which has been severed is retained between said first jaw and said second jaw by said spring biasing means.

2. A cutting device as described in claim 1, wherein said means which allows said blade and said second jaw to pivot about a common point is a pin located through a void in said blade and in said second jaw, and wherein one end of said coil spring is mounted to said pin, with the opposite end of said coil spring mounted to a point on said second jaw.

3. A cutting device which will retain an object which has been severed as described in claim 2, wherein said first jaw, said blade, and said second jaw are mounted to each other by a single, common pin which allows said first jaw, said blade and said second jaw to pivot about said common pin.

4. A cutting device which will retain an object which has been severed, as described in claim 3, further comprising a protrusion from said second jaw located opposite a surface of said second jaw which faces said first jaw, and which contacts said blade so as to limit travel of said second jaw relative to said blade.

5. A cutting device which will retain an object which has been severed, as described in claim 2, further comprising a protrusion from said second jaw located opposite a surface of said second jaw which faces said first jaw, and which contacts said blade so as to limit travel of said second jaw relative to said blade.

6. A cutting device which will retain an object which has been severed as described in claim 1, wherein said first jaw, said blade, and said second jaw are mounted to each other by a single, common means which allows said first jaw, said blade and said second jaw to pivot about a common point.

7. A cutting device which will retain an object which has been severed, as described in claim 6, further comprising a protrusion from said second jaw located opposite a surface of said second jaw which faces said first jaw, and which contacts said blade so as to limit travel of said second jaw relative to said blade.

8. A cutting device which will retain an object which has been severed, as described in claim 1, further comprising a protrusion from said second jaw located opposite a surface of said second jaw which faces said first jaw, and which contacts said blade so as to limit travel of said second jaw relative to said blade.

* * * * *